US011919182B2

(12) United States Patent
Tringali et al.

(10) Patent No.: US 11,919,182 B2
(45) **Date of Patent: *Mar. 5, 2024**

(54) THERMAL INSULATIVE BARRIER BLADE CAP

(71) Applicant: Andis Company, Sturtevant, WI (US)

(72) Inventors: Richard J. Tringali, Racine, WI (US); Jeffrey D. Gross, Kenosha, WI (US); Joseph Novak, Milwaukee, WI (US)

(73) Assignee: Andis Company, Sturtevant, WI (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/538,546

(22) Filed: Nov. 30, 2021

(65) Prior Publication Data

US 2022/0080609 A1 Mar. 17, 2022

Related U.S. Application Data

(63) Continuation of application No. 16/707,494, filed on Dec. 9, 2019, now Pat. No. 11,213,962.

(60) Provisional application No. 62/778,650, filed on Dec. 12, 2018.

(51) Int. Cl.
*B26B 19/38* (2006.01)

(52) U.S. Cl.
CPC ...... *B26B 19/3813* (2013.01); *B26B 19/3853* (2013.01); *B26B 19/3846* (2013.01)

(58) Field of Classification Search
None
See application file for complete search history.

(56) References Cited

U.S. PATENT DOCUMENTS

| | | | | |
|---|---|---|---|---|
| 1,628,421 | A | 5/1927 | Patenaude | |
| 2,291,439 | A * | 7/1942 | Andis | B26B 19/3846 30/200 |
| 9,434,078 | B2 | 9/2016 | Julemont | |
| 10,144,142 | B1 | 12/2018 | Squires et al. | |
| 10,160,125 | B1 | 12/2018 | Skye | |
| 11,213,962 | B2 * | 1/2022 | Tringali | B26B 19/3813 |
| 2006/0207105 | A1 | 9/2006 | Alvite et al. | |
| 2011/0173818 | A1 | 7/2011 | Lacov et al. | |
| 2014/0331504 | A1 | 11/2014 | Michel | |
| 2016/0075039 | A1 | 3/2016 | Werner | |
| 2018/0361602 | A1 | 12/2018 | Toy et al. | |
| 2020/0189134 | A1 | 6/2020 | Tringali et al. | |
| 2020/0198159 | A1 | 6/2020 | Werner et al. | |
| 2022/0080609 | A1 * | 3/2022 | Tringali | B26B 19/3853 |

FOREIGN PATENT DOCUMENTS

| | | |
|---|---|---|
| EP | 4 032 667 A1 * | 7/2022 |
| KR | 10-1668754 * | 10/2016 |

* cited by examiner

*Primary Examiner* — Hwei-Siu C Payer
(74) *Attorney, Agent, or Firm* — Reinhart Boerner Van Deuren s.c.

(57) ABSTRACT

A blade cap is provided to shield a user from heat generated by operation of a blade assembly. The blade cap provides an insulative barrier between the blade assembly and the skin of the user. The blade cap may prevent discomfort or burns from the heat generated by the blade assembly. The blade cap includes openings, channels, projections, tabs, and other formations to allow the flow of air through the passageways between the blade cap and the blade.

19 Claims, 15 Drawing Sheets

THERMAL INSULATIVE BARRIER BLADE CAP

CROSS-REFERENCE TO RELATED PATENT APPLICATION

The present application is a continuation of U.S. application Ser. No. 16/707,494, now U.S. Pat. No. 11,213,962, filed Dec. 9, 2019, which claims the benefit of and priority to U.S. Provisional Application No. 62/778,650 filed on Dec. 12, 2018, which is incorporated herein by reference in its entirety.

BACKGROUND OF THE INVENTION

The present invention relates generally to the field of hair clippers. Hair clippers include a blade set having a fixed blade in face-to-face relation with a moveable blade. An electric motor drives the movable blade relative to the fixed blade to create a reciprocating motion to cut hair. The present invention relates specifically to a thermal barrier to the heat generated at the blade assembly.

SUMMARY OF THE INVENTION

One embodiment of the invention relates to a hair clipper with a thermal barrier. The hair clipper includes a blade assembly and the thermal barrier. The blade assembly includes an inner blade with blade teeth and an outer blade with teeth oriented parallel to the inner blade teeth. The inner and outer blades facilitate cutting when the inner blade oscillates over the outer blade. Heat is generated on the outer blade due to friction as the inner blade oscillates over the outer blade. The thermal barrier removably couples to a surface of the outer blade.

Another embodiment of the invention relates to a hair clipper with a blade cap. The hair clipper includes a blade assembly with an inner blade having blade teeth and an outer blade having blade teeth oriented parallel to the inner blade teeth. The inner and outer blades cooperate to facilitate cutting as the inner blade oscillates over the outer blade. As a result of the oscillations, frictional heat is generated on the outer blade. The blade cap includes open pockets located between the blade cap and a surface of the outer blade. The blade cap is removably coupled to the outer blade to thermally insulate the outer blade from the user's scalp.

Another embodiment of the invention relates to a hair clipper with a thermal insulative barrier. The hair clipper has a blade assembly with an inner blade having blade teeth and an outer blade having blade teeth oriented parallel to the inner blade teeth. The inner and outer blades cut hair when the inner blade oscillates over the outer blade. The oscillation of the inner blade over the outer blade generates heat on the outer blade. The thermal insulative barrier has open pockets with projections and channels between the open pockets. The projections provide structural support to the thermal insulative barrier when pressed against the surface of the outer blade. The air pockets receive ambient air that circulates in the open pockets to thermally insulate the thermal insulative barrier.

Another embodiment of the invention relates to a thermally insulative blade cap. The blade cap provides thermal insulation between the blade assembly and the skin of a user. The friction between the stationary and oscillating blades of a blade assembly generates heat that may cause discomfort or burn a user. The thermal insulative barrier blade cap provides thermal insulation to enhance comfort while operating the hair clippers.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a blade assembly and blade cap are shown. In operation, the blade assembly generates friction between a stationary first (e.g., outer) blade and an oscillating second (e.g., inner) blade. The friction between the blades generates heat that can cause discomfort or burns to the skin of the user. Applicant has found that the use of thermally insulative barrier protects the skin of the user and provides for a safe and efficient way to reduce the energy transmitted to the skin (e.g., scalp) of the user. Air channels and pockets formed throughout the blade cap also reduce the heat transferred from the blade assembly to the blade cap.

The term "hair clipper" is inclusive, and refers to any hair grooming device, including, but not limited to, a hair trimmer, a hair clipper, or any other hair cutting or hair grooming device. In addition, the hair grooming device can be suitable for a human, animal, or any other suitable living or inanimate object having hair.

Figure 1:
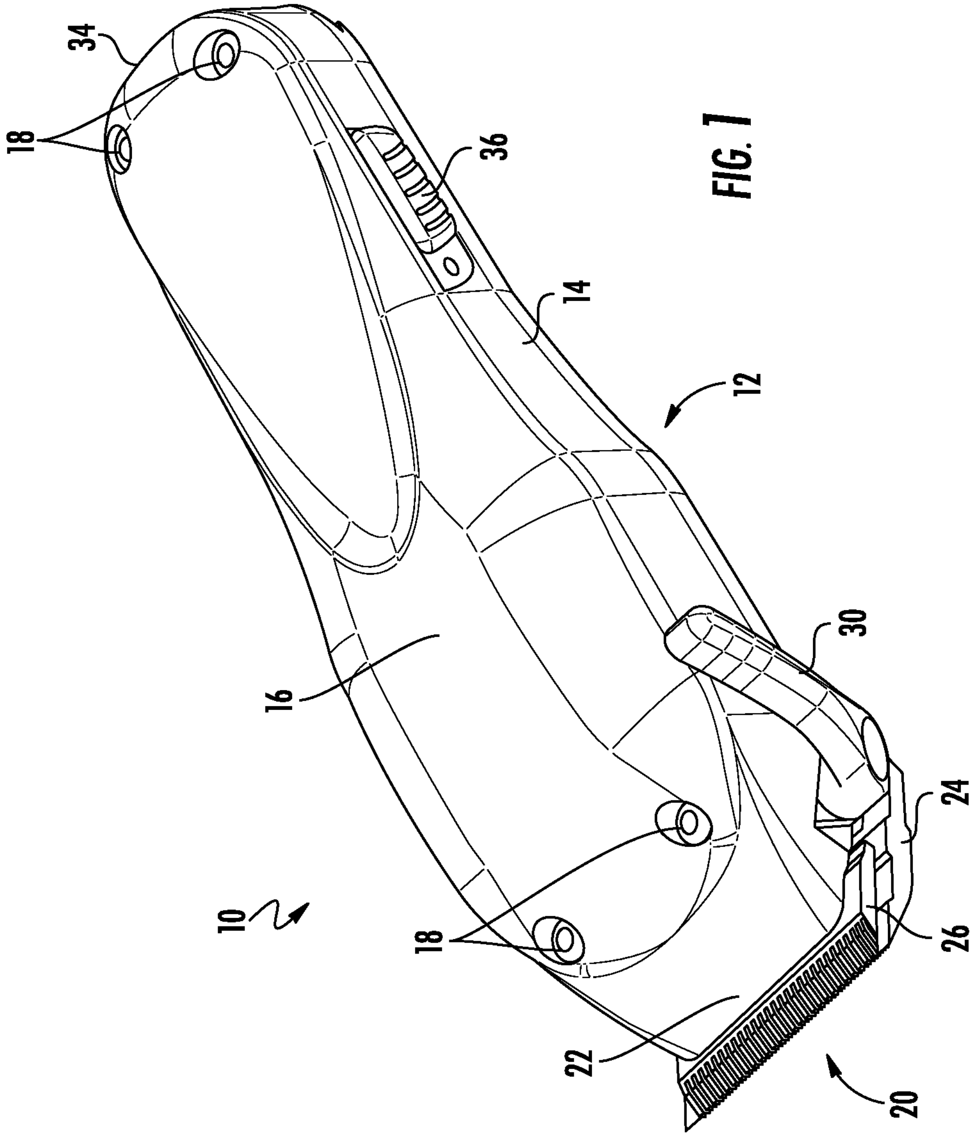
FIG. 1 is a perspective view of a hair clipper, according to an exemplary embodiment.

FIG. 1 illustrates an example of an embodiment of a hair clipper 10 having a hand-held body 12. Body 12 is defined by a lower or first housing 14 and a removable cover 16. A plurality of fasteners 18 (e.g., bolts, screws, etc.) couple cover 16 to lower housing 14. A cutting head assembly 20 is coupled to a first end 22 of body 12. Cutting head assembly 20 includes a lower plate 24 and an upper plate or cutter 26. Cutter 26 is supported on lower plate 24, and is movable with respect to lower plate 24. Cutter 26 can define a drive socket (not shown) that is configured to engage a reciprocating or oscillating drive assembly 28 (shown in FIG. 2). Drive assembly 28 is configured to generate oscillating or reciprocating movement of cutting head assembly 20 to facilitate cutting of hair.

A taper lever 30 is operably connected to cutting head assembly 20. Taper lever 30 adjusts the position of one of lower plate 24 or cutter 26 in relation to the other of cutter 26 or lower plate. For example, rotation of taper lever 30 towards cutting head assembly 20 (e.g., counter-clockwise as viewed in FIG. 1) results in a shorter cut, as the edges of lower plate 24 and cutter 26 are in close proximity (or at a reduced distance) to one another. FIG. 1 illustrates cutting head assembly 20 configured to make the shorter cut. Rotation of taper lever 30 away from cutting head assembly 20 (e.g., clockwise as viewed in FIG. 1) results in a longer cut, as one of lower plate 24 or cutter 26 is repositioned away from the other of cutter 26 or lower plate 24, resulting the edges of lower plate 24 and cutter 26 being separated or offset from each other (or separated by a greater distance or not in close proximity).

A power source 34 is configured to connect to a suitable source of power, such as an outlet, battery, or other source of power. In other embodiments, power source 34 can be a battery (or rechargeable battery) that is positioned in body 12. A switch 36 is positioned on body 12 (and more specifically lower housing 14) for powering drive assembly 28 (shown in FIG. 2) "on" or "off." The switch 36 is user operable, for example it can be actuated by a thumb of the user. Positioning the switch 36 into the "on" position provides power to drive assembly 28, while positioning the switch 36 into the "off" position terminates power to drive assembly 28.

Figure 2:
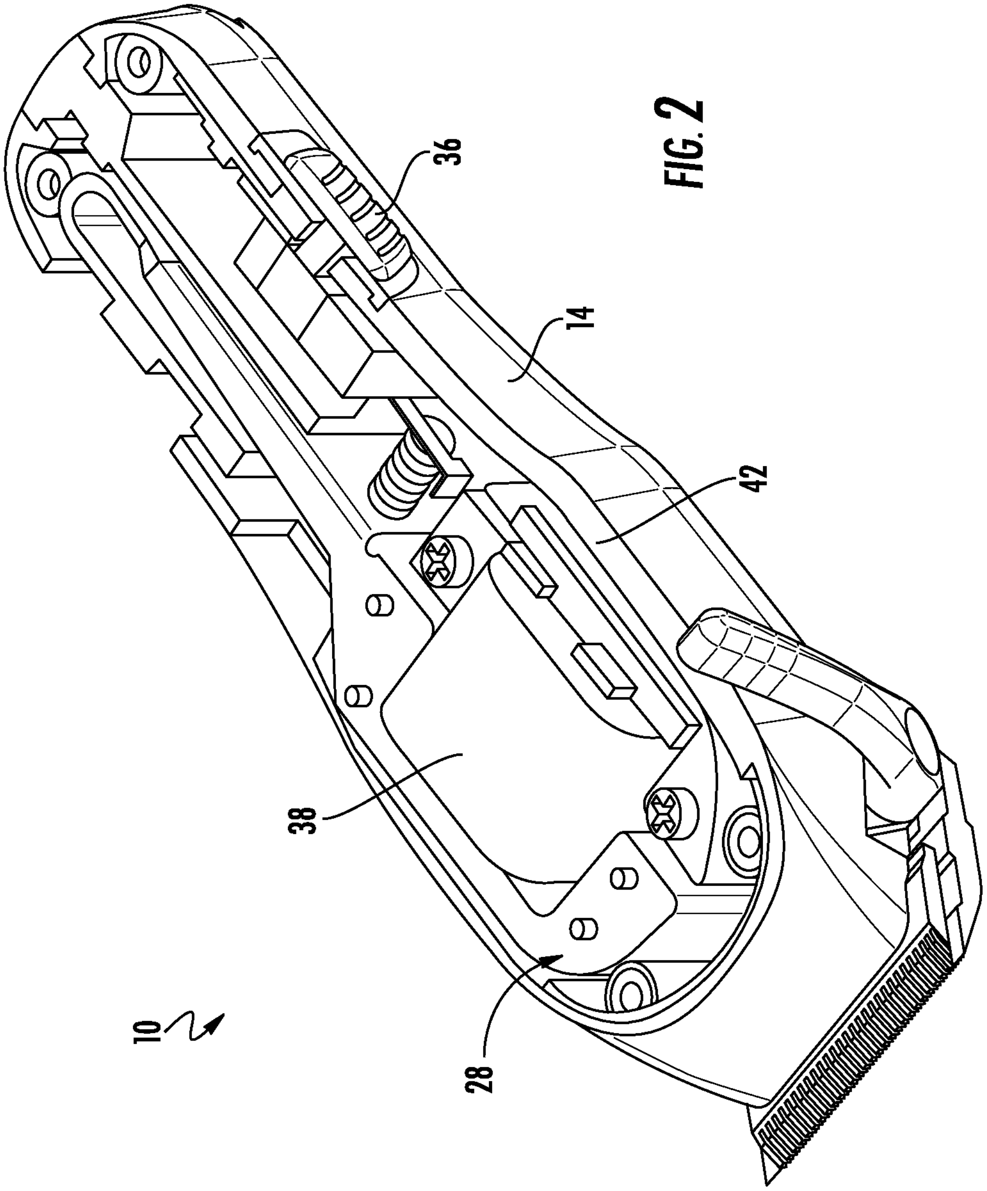
FIG. 2 is a perspective view of the hair clipper of FIG. 1 with the cover or upper housing removed, according to an exemplary embodiment.
Figure 3:
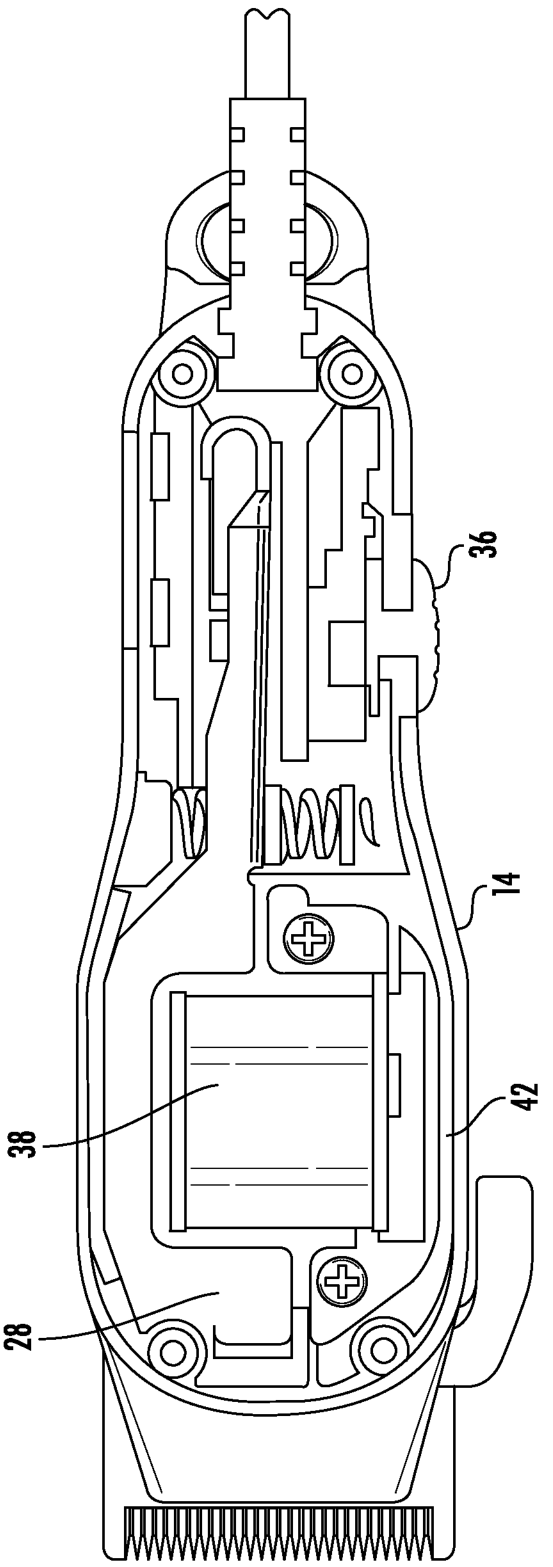
FIG. 3 is a top view of the hair clipper of FIG. 2, with the upper housing removed, according to an exemplary embodiment.

Referring to FIGS. 2-3, hair clipper 10 is depicted with cover 16 removed to illustrate drive assembly 28. In the illustrated embodiment, lower housing 14 contains drive assembly 28, which includes an electric motor 38. The electric motor 38 illustrated in FIG. 2 is a magnetic motor 38. However, in other examples of embodiments, the electric motor 38 can be a pivot motor, a rotary motor, or any other suitable motor for generating oscillating or reciprocating movement of cutting head assembly 20.

Figure 4:
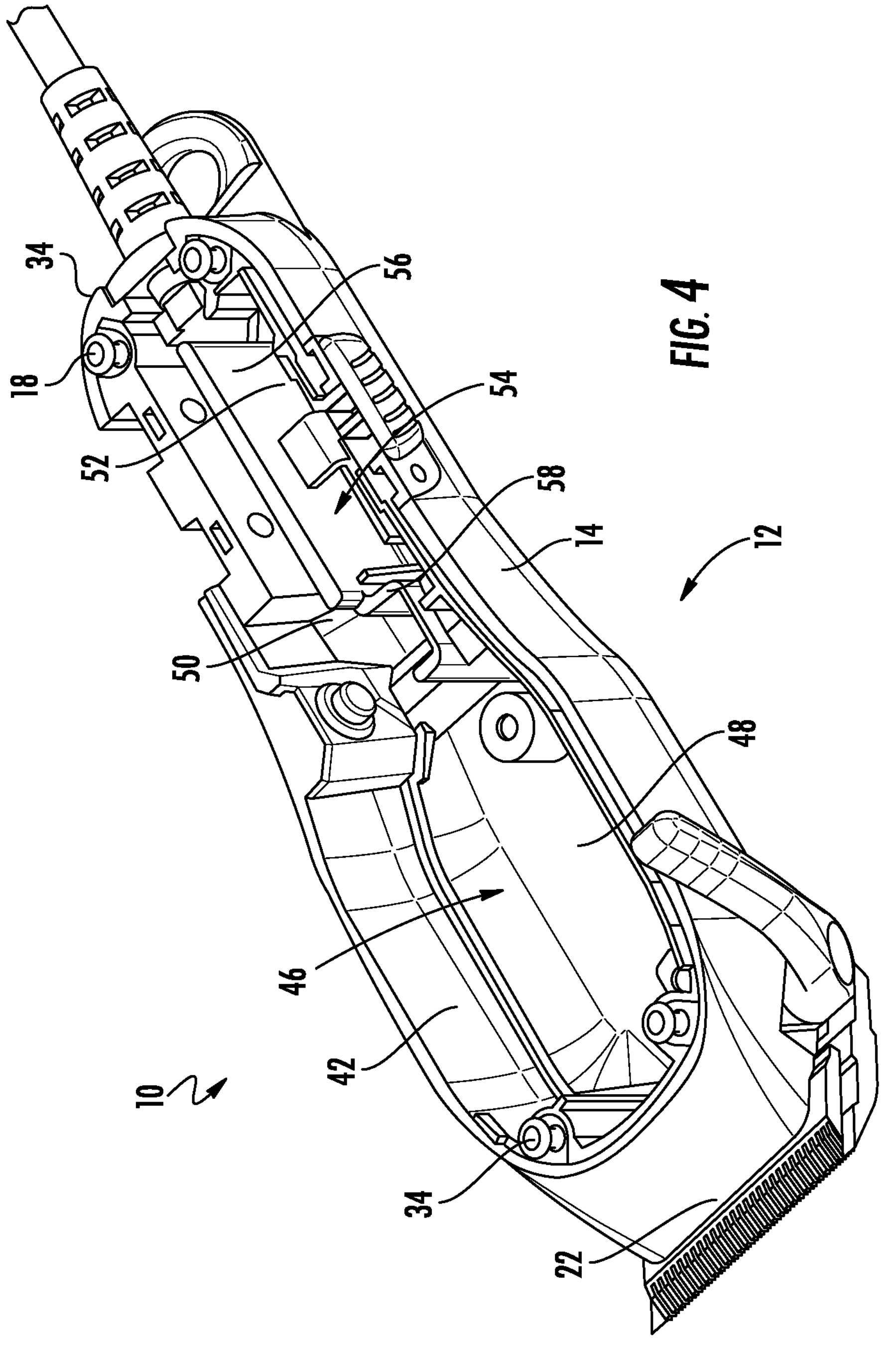
FIG. 4 is a perspective view of the hair clipper of FIG. 1, with both the cover and the drive assembly removed.

Referring now to FIG. 4, hair clipper 10 is depicted with both cover 16 and drive assembly 28 removed. Lower housing 14 defines a substantially hollow cavity. In some embodiments, lower housing 14 is configured to receive a liner 42. Liner 42 can include an insulative liner 42 that nests into lower housing 14. The cavity defines a hollow portion or volume 46 that is configured to receive drive assembly 28 (as shown in FIG. 3). In addition to being nested in lower housing 14, insulative liner 42 can be encased (or partially enclosed by or sandwiched between) cover 16 (shown in FIG. 1) and lower housing 14.

Figure 5:
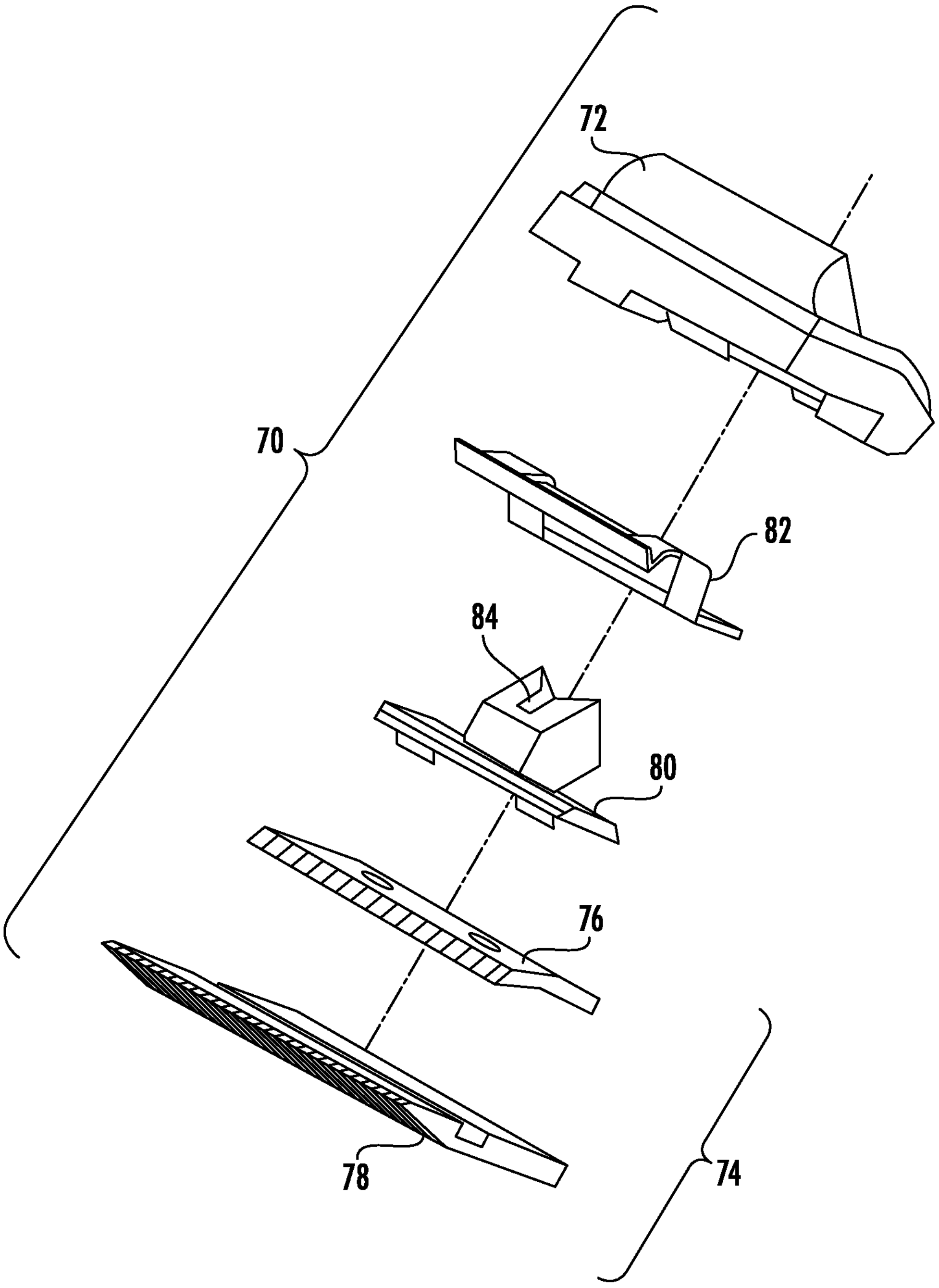
FIG. 5 is an exploded view of a blade assembly, according to an exemplary embodiment.

As illustrated in FIG. 5, a blade assembly 70 is located proximate the cutting or first end 22 of body 12. Blade assembly 70 includes a blade frame 72 to support the components of blade assembly 70.

A blade set 74 within blade assembly 70 has an inner blade 76 and an outer blade 78. Inner blade 76 moves relative to the fixed or outer blade 78. Outer blade 78 can be coupled to blade frame 72 (e.g., by screws), although any suitable fastener can be employed to secure outer blade 78 to blade frame 72. Inner blade 76 is coupled to a blade box 80 by screws (not shown) and is biased toward outer blade 78 by a biasing spring 82. Spring 82 can couple to outer blade 78 with screws. A yoke 84 of blade box 80 receives the eccentric (e.g., eccentric drive 116 illustrated in FIG. 6), and inner blade 76 and blade box 80 are supported such that inner blade 76 moves back and forth across outer blade 78 in response to movement of the eccentric (FIG. 6).

Figure 6:
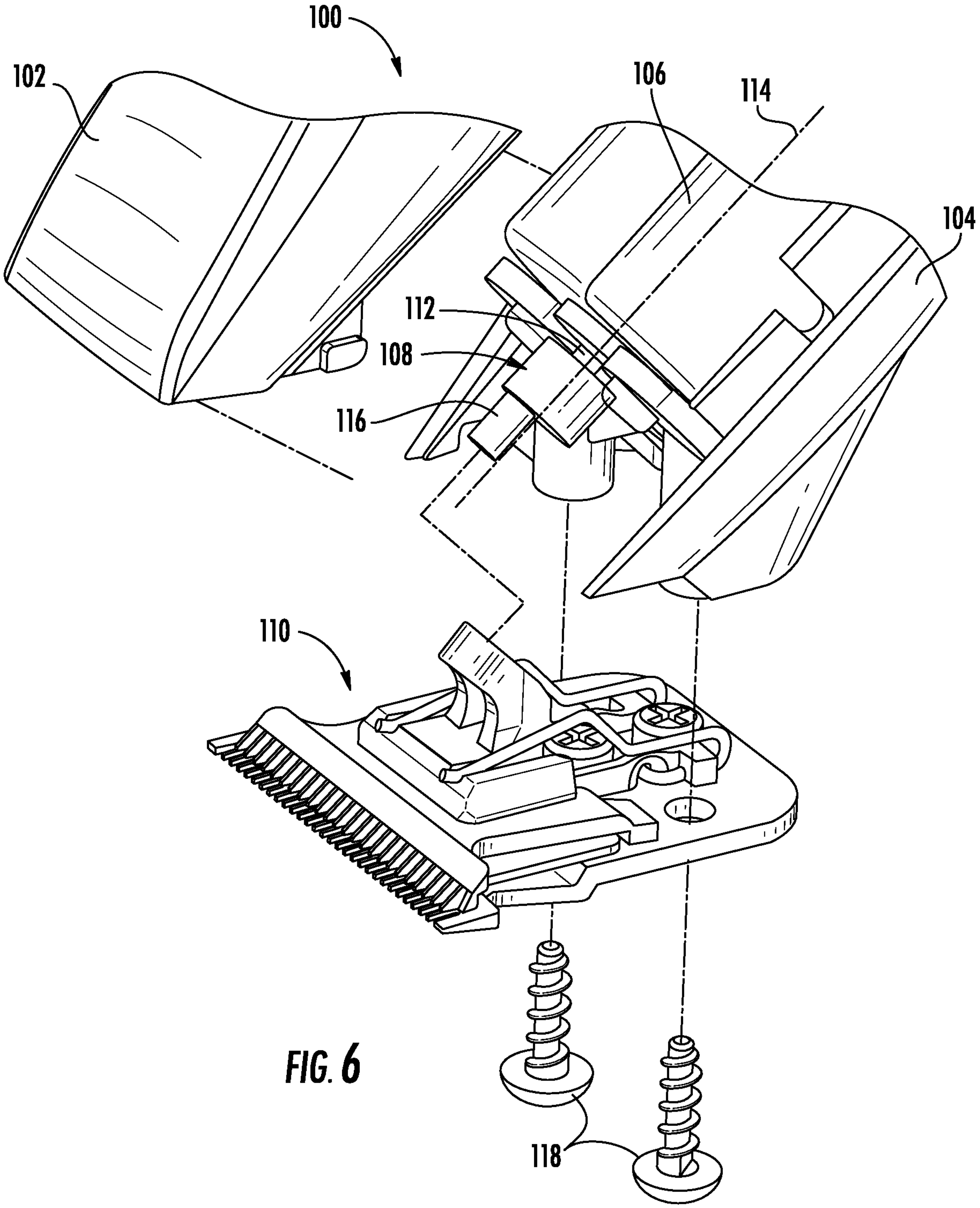
FIG. 6 is a partially exploded view with the blade assembly removed from the rest of the hair cutting apparatus.

FIG. 6 illustrates another embodiment of a hair cutting apparatus 100, such as a trimmer or clipper, having an upper housing 102, a lower housing 104, an electric motor 106, a drive mechanism 108, and a blade assembly 110 (e.g., the same as or similar to blade assembly 70 described above in reference to FIG. 5). Upper housing 102 and lower housing 104 may form to body of the hair clippers in a clamshell configuration. As illustrated, upper housing 102 and lower housing 104 surround motor 106 and drive mechanism 108. The upper and lower housing 102 and 104 can form the body of the hair clippers in any other suitable configuration. The electric motor 106 can operate with electric power e.g., from batteries or electricity from a power outlet. The electric motor 106 includes a rotating output shaft 112 that rotates about an axis of rotation 114. Drive mechanism 108 includes an eccentric drive 116 that is offset from the axis of rotation 114 of the motor output shaft 112. As illustrated, blade assembly 110 is secured to the hair cutter apparatus housing 102 and/or 104 by way of a pair of housing fasteners 118.

Figure 7:
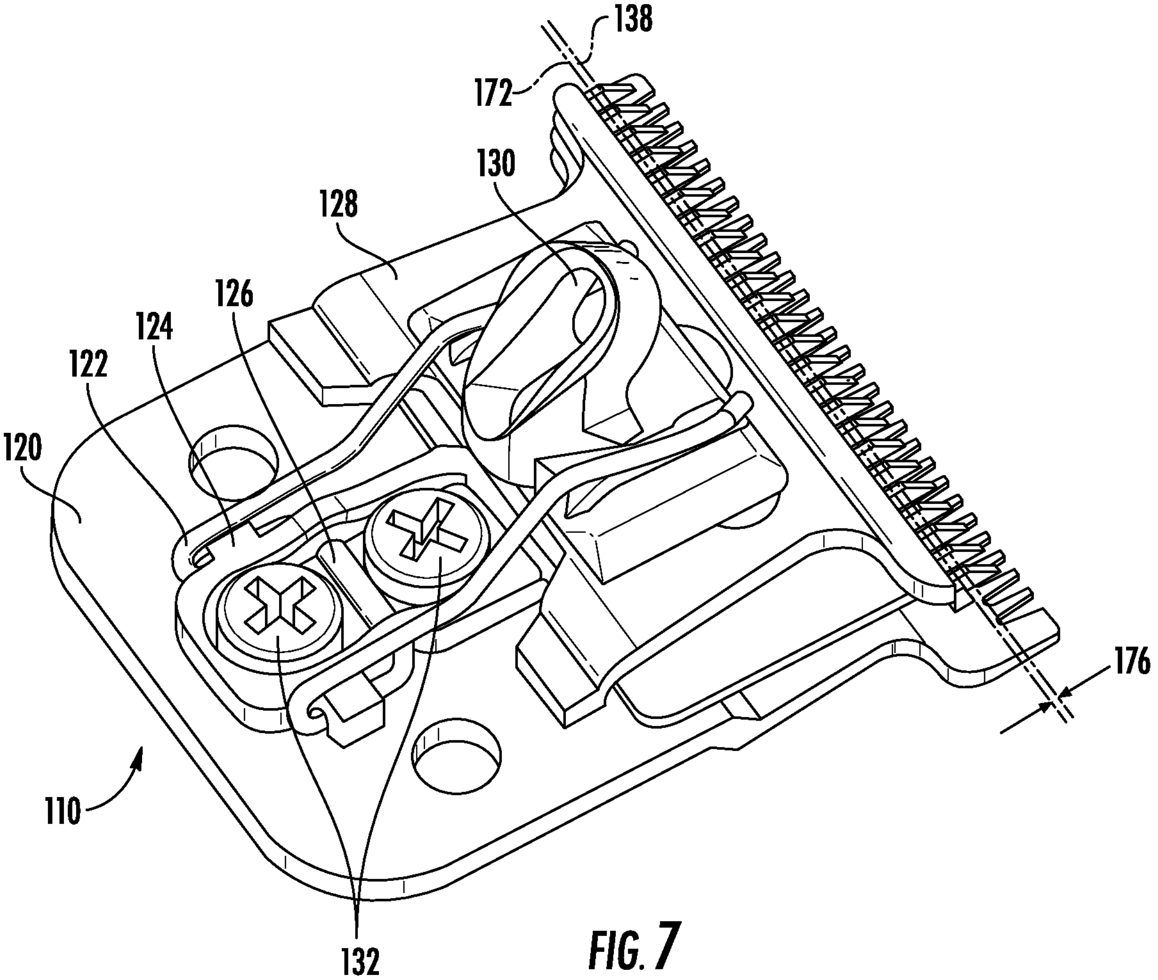
FIG. 7 is a perspective view of the blade assembly in a minimum blade gap setting.
Figure 8:
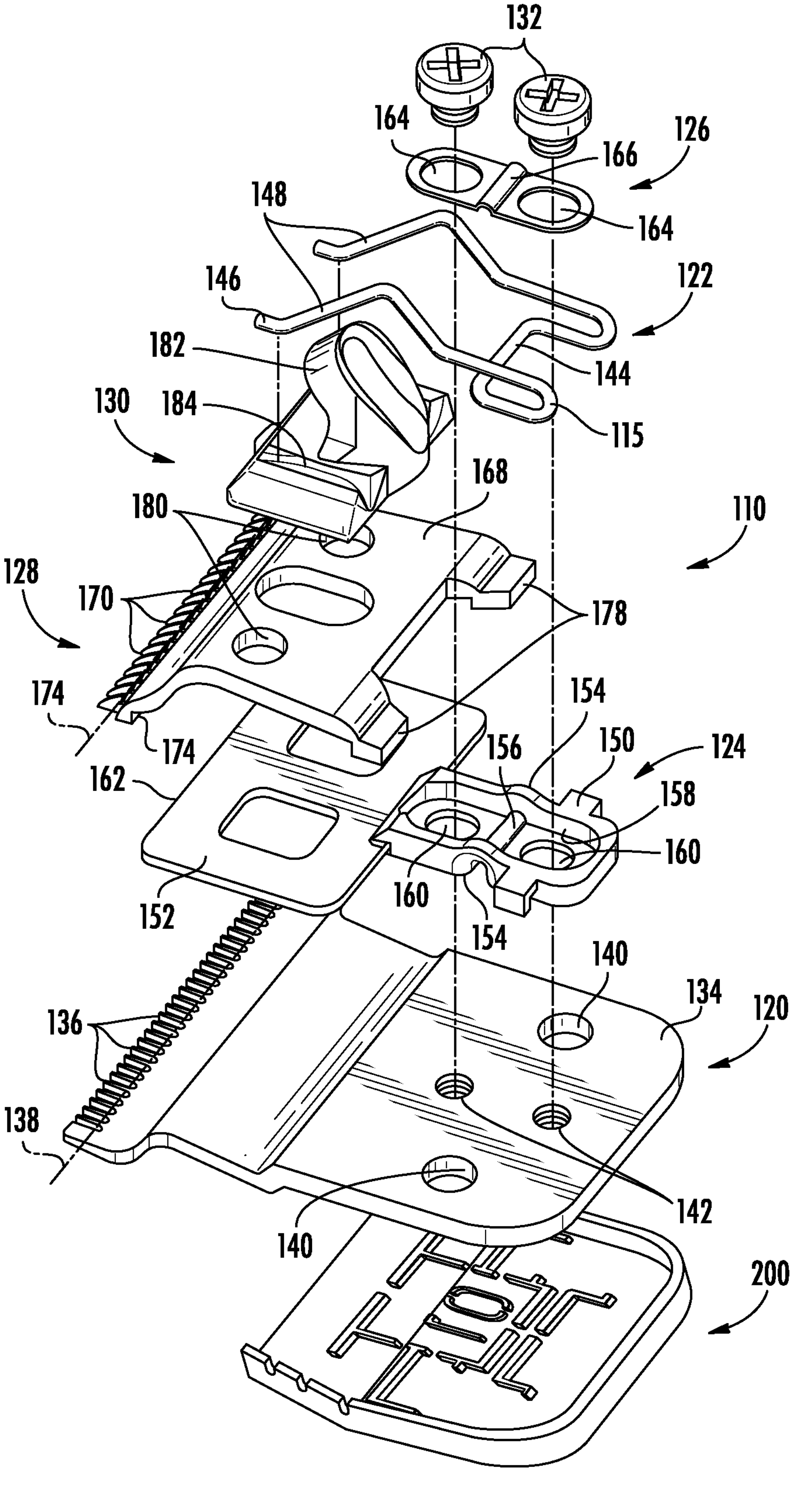
FIG. 8 is an exploded view of the blade assembly with the thermal insulative barrier, according to an exemplary embodiment.

FIGS. 7-8 illustrate blade assembly 110, which includes an inner or lower blade 120, a spring 122, a guide 124, a washer 126, an upper blade 128, a yoke 130, and a pair of guide fasteners 132. With reference to FIG. 8, lower blade 120 includes a main body with a surface 134 and a plurality of lower blade teeth 136. Lower blade teeth 136 extend along a nominal lower blade edge 138, which may be defined, for example, by a line connecting the roots of lower blade teeth 136 (or a line connecting tips of lower blade teeth 136). Lower blade 120 also includes a pair of through-holes 140 for mounting blade assembly 110 to housing 102 and/or 104 with housing fasteners 118, and a pair of threaded holes 142 for receiving guide fasteners 132.

Spring 122 includes a U-shaped spring base 144 and a pair of spring arms 148 extending generally parallel to each other from spring base 144. Each spring arm 148 has a fixed end 145 integral with spring base 144 and a free end 146 coupled to yoke 130 or upper blade 128. Spring base 144 sits against surface 134 of lower blade 120 and is held in place by guide 124. In this regard, guide 124 may also be referred to as a spring retainer. Guide 124 fixes spring base 144 with respect to lower blade 120 to prevent relative movement between spring base 144 and lower blade 120 during reciprocation of spring arms 148, upper blade 128, and yoke 130 with respect to lower blade 120.

Guide 124 is a T-shaped piece that is mounted to lower blade 120 and includes a guide base 150 and a cross portion 152. Guide base 150 includes a pair of arches 154 and an arched tunnel 156, all opening toward lower blade 120, to accommodate and trap spring base 144 against lower blade 120. Guide base 150 therefore incorporates a spring retainer. Guide base 150 includes a washer recess 158 and a pair of slots 160 extending parallel to the major axis of guide base 150 and perpendicular to the major axis of cross portion 152. Cross portion 152 includes a guide edge 162 parallel to lower blade edge 138 when guide 124 is installed on lower blade 120. Guide 124 performs two functions: guiding reciprocating movement of upper blade 128 with guide edge 162 and retaining spring 122 against the body or surface 134 of lower blade 120 with guide base 150.

Washer 126 sits in washer recess 158 in guide base 150. Washer 126 includes a pair of slots 164 that align with slots 160 in guide base 150. Washer 126 also includes an arched portion 166 to accommodate the arched tunnel 156 in guide base 150. Guide fasteners 132 extend through slot 160 and slot 164 in washer 126 and guide base 150, respectively, and thread into threaded holes 142 in the main body and/or surface 134 of lower blade 120. With guide fasteners 132 tightened down against washer 126 and guide base 150, spring base 144 is trapped against and fixed with respect to lower blade 120.

Upper blade 128, which may also be referred to as the inner or second blade, sits on top of lower blade 120 and guide 124. Guide 124 is sandwiched between lower blade 120 and upper blade 128. Upper blade 128 includes a main body 168 and a plurality of inner or upper blade teeth 170. Upper blade teeth 170 extend along a nominal upper blade edge 172, which may be defined, for example, by a line connecting the roots of the teeth 170. Upper blade 128 is positioned proximate lower blade 120 with the upper blade edge 172 parallel to and offset from lower blade edge 138. Rearward of the upper blade edge 172, on the bottom side of upper blade 128, is a depending guide surface 174 that is parallel to the upper blade edge 172 and that engages guide edge 162. Guide edge 162 restricts movement of upper blade 128 perpendicular to lower blade edge 138.

The engagement of guide surface 174 against guide edge 162 guides movement of upper blade 128 parallel to blade edge 138 of lower blade 120. This engagement maintains a consistent blade gap 176 (FIG. 7) between parallel upper and lower blade edges 172 and 138 as upper blade 128 reciprocates with respect to lower blade 120. Blade gap 176 refers to a forward-rearward offset of the blade edges 138 and 172 and not a vertical separation; the upper blade teeth 170 are immediately adjacent or proximate the outer or lower blade teeth 136 to perform a shearing function. For example, lower blade teeth 136 are oriented parallel to upper blade teeth 170. For example, blade edges 138 and 172 of lower and upper blade teeth 136 and 170 are substantially parallel to facilitate cutting when upper blade 128 oscillates over lower blade 120. In general, heat is generated on lower and upper blades 120 and 128 as upper blade 128 oscillates over lower blade 120. Guide 124 therefore serves the purpose of maintaining a constant blade gap 176 to reduce the friction and fix spring base 144 with respect to lower blade 120. Guide 124 also retains translating upper blade 128.

A pair of feet 178 depend from the rear end of the upper blade body 168. Feet 178 straddle guide base 150 and sit on the body or surface 134 of lower blade 120. Feet 178 create a vertical gap between the rear edges of the upper and lower blades 128 and 120, such that guide base 150 can extend rearward through the vertical gap. The distance between feet 178 provides sufficient room for upper blade 128 to reciprocate with respect to lower blade 120 and guide 124, without feet 178 hitting guide base 150. Upper blade body 168 includes a pair of holes 180 for coupling upper blade 128 with yoke 130.

Yoke 130 sits on top of upper blade 128. A pair of pair of pegs depending from the bottom of yoke 130 are inserted into holes 180 in main body 168 of upper blade 128 so that yoke 130 is coupled to upper blade 128. Yoke 130 includes a receiver 182 for receiving eccentric drive 116 of drive mechanism 108. Yoke 130 also includes grooves or channels 184 on opposite sides of receiver 182.

For example, yoke 130 couples to upper blade 128 to couple eccentric drive 116 to a rotary motor (e.g., motor 38 of FIG. 2). Rotation of eccentric drive 116 oscillates within yoke 130 to translate or oscillate yoke 130 and upper blade 128 over lower blade 120.

Channels 184 receive free ends 146 of spring arms 148, such that free ends 146 can apply a downward biasing force on yoke 130 and slide forward and rearward within channels 184 as yoke 130 and upper blade 128 reciprocate with respect to lower blade 120. Yoke 130 is adapted to convert motion of drive mechanism 108 into reciprocation of upper blade 128 with respect to lower blade 120 to cut hair between lower blade teeth 136 and 138 of lower and upper blades 120 and 128. In alternative configurations, spring arms 148 may be coupled at their free ends 146 to upper blade 128 rather than yoke 130.

Blade assembly 110 is assembled by stacking spring 122, guide 124, washer 126, upper blade 128, and yoke 130 on lower blade 120, and then extending guide fasteners 132 through slots 160 and 164 of washer 126 and guide 124 and threading guide fasteners 132 into threaded holes 142 in lower blade 120. Free ends 146 of spring arms 148 are positioned in channels 184 of yoke 130. Spring 122 applies a downward biasing force on yoke 130 and an upward biasing force on lower blade 120 to draw yoke 130 and lower blade 120 toward each other. These biasing forces of spring 122 sandwich upper blade 128 between yoke 130 and lower blade 120. Spring 122 may be characterized as a tension spring because when blade assembly 110 is assembled, spring arms 148 and spring base 144 are separated from each other wider than their at-rest position or relationship, and spring 122 is attempting to draw or pull spring arms 148 and spring base 144 back to the at-rest position.

Spring arms 148 are of sufficient length (measured from fixed ends 145 to free ends 146) to accommodate the full range of reciprocating motion of upper blade 128 and yoke 130 with respect to lower blade 120. Spring arms 148 may be relatively short because of the position of spring base 144 in blade assembly 110, and spring 122 often requires compliance coils in base 144 or arms 148 to accommodate some of the reciprocating motion. In some embodiments, no compliance coil in spring base 144 or in spring arms 148 is used to accommodate reciprocation of upper blade 128 with respect to lower blade 120. In some embodiments, spring arms 148 may include a bearing or other device to further secure and assist the oscillations of upper blade 128.

FIG. 8 illustrates a thermal insulative barrier or blade cap 200 at the bottom of blade assembly 110. Blade cap 200 is made of a material with a high thermal resistance (low thermal conductivity), relative to blade assembly 74 and/or 110. For example, blade assembly 74 and/or 110 is a metallic material and blade cap 200 includes a plastic and/or polymer material. For example, blade cap 200 includes a thermoset or thermoplastic polymer to protect the skin of a user during operation. Blade cap 200 is shown in exploded view below lower blade 120. In operation blade cap 200 may attach (e.g., clip on) to lower blade 120 to protect the user from thermal transmission of heat from blade assembly 110. As described in detail below, blade cap 200 may have features designed to circulate airflow and/or otherwise thermally insulate blade assembly 110 from the skin of a user.

Figure 9:
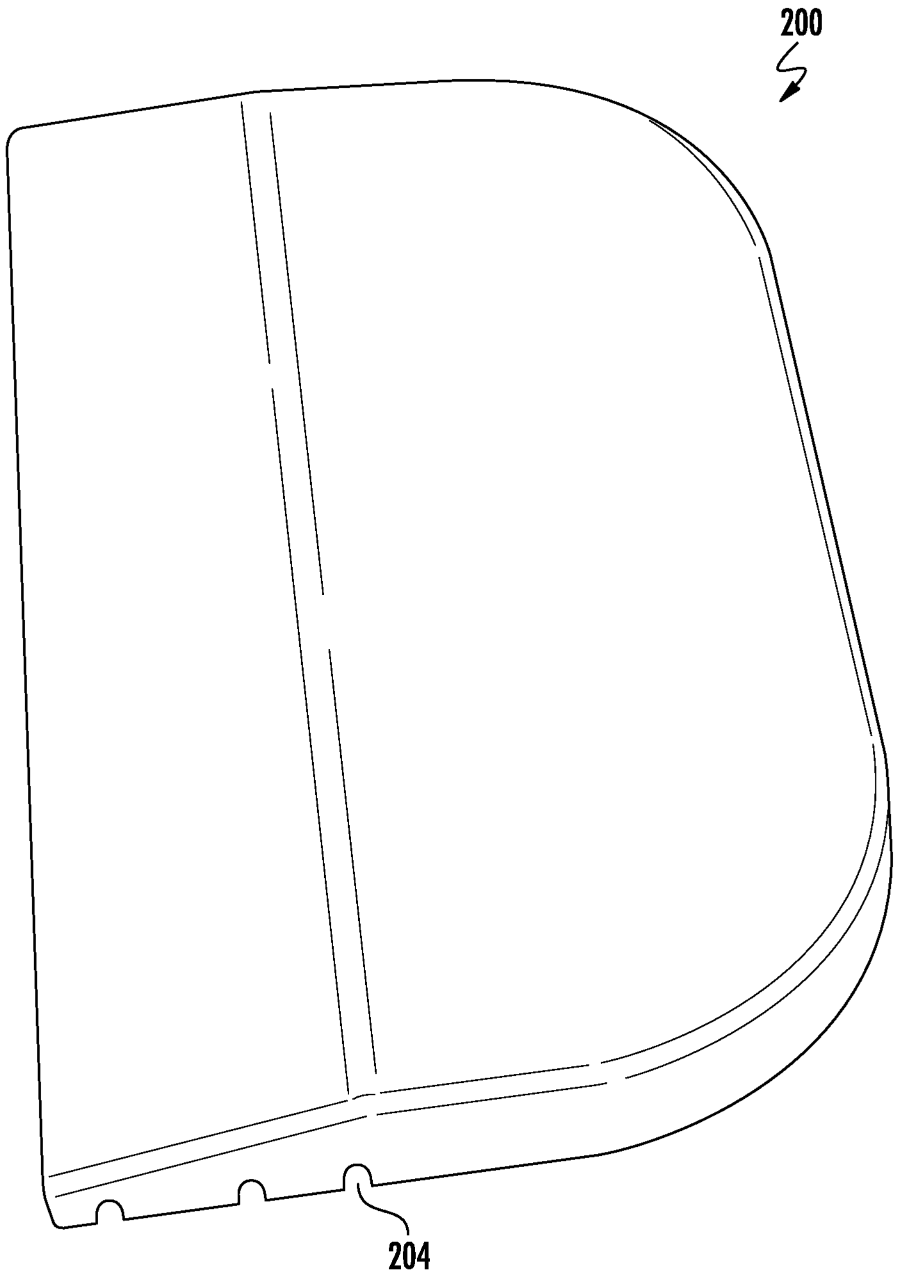
FIG. 9 is a perspective view of the bottom side of a blade cap providing thermal insulation from the blade assembly and designed for direct contact with the skin, according to an exemplary embodiment.

FIG. 9 is a top perspective view of a blade cap 200. Blade cap 200 couples to a blade assembly 110 (e.g., FIG. 5) to protect the skin (e.g., scalp) of a user from frictional heat during operation of blade assembly 110. Blade cap 200 includes voids on an inner surface 202 of blade cap 200. For example, voids are created between lower blade 120 and inner surface 202 of blade cap 200. Pockets and/or openings 204 are illustrated on the side of blade cap 200 to vent air through the thermally isolating blade cap 200. For example, openings 204 are located on either side of blade cap 200 and are in fluid communication with ambient air. In some embodiments, openings 204 couple pockets between inner surface 202 of blade cap 200 and an outer surface of assembly 74 and/or 110. Openings 204 may or may not be in fluid communication with ambient air.

Figure 10:
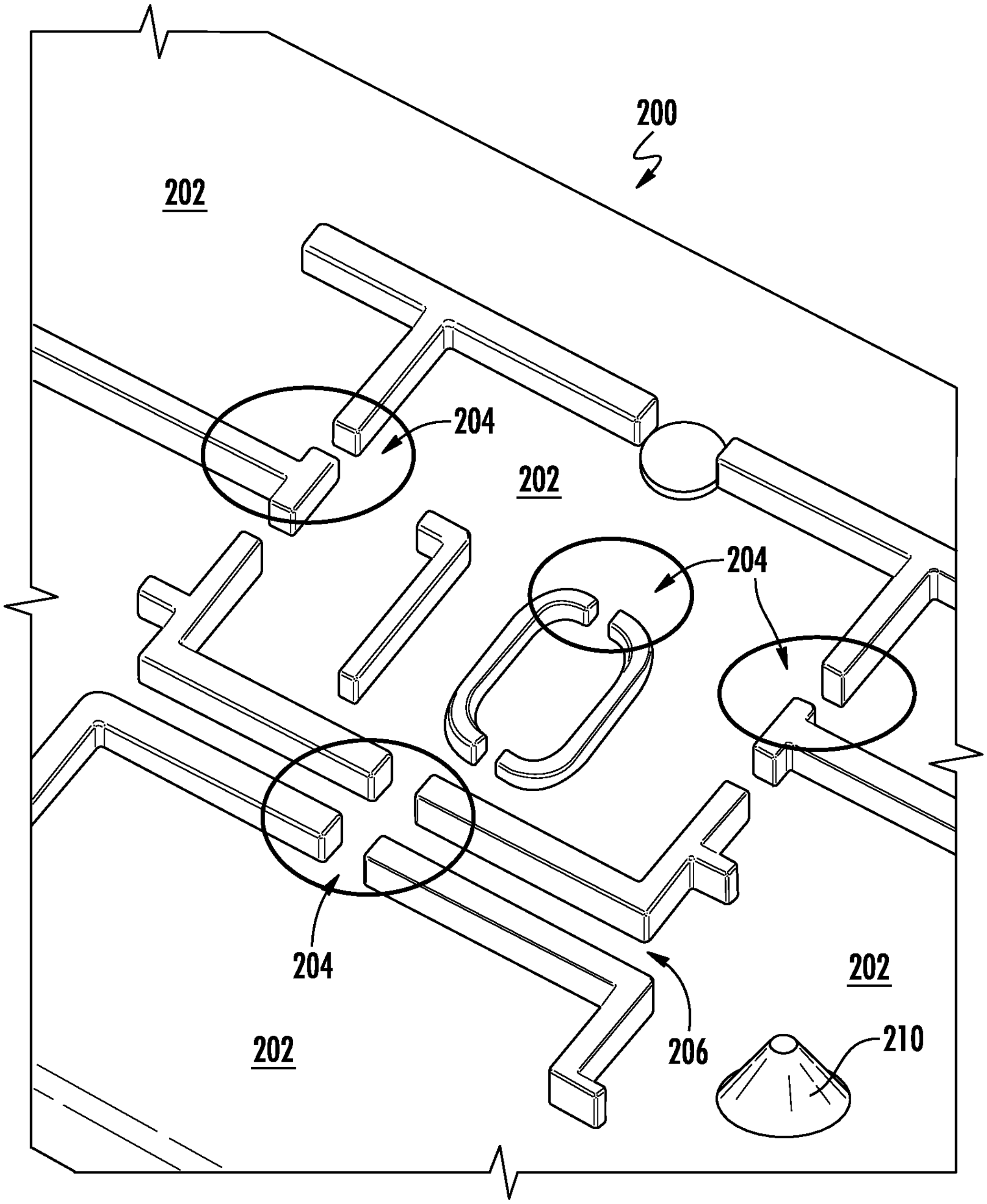
FIG. 10 is a detailed view of the inside or upper side of the blade cap that illustrates the channels and openings formed within the blade cap to enhance circulation and improve the thermal insulative features of the blade cap.

Thermally isolating blade cap 200 insulates blade assembly 110 from the skin of a user or animal to protect against burns or other thermal discomfort. FIG. 10 is a detailed view of inner surface of blade cap 200. Pockets, openings 204, and/or air channels 206 are located on an inner surface 202 of blade cap 200. As illustrated, blade cap 200 is configured for a number 10 detachable blade size; however, other blade sizes are envisioned. For example, blade cap 200 could be manufactured to fit a standard number 4, 5, 7, 10, 15, 30, and 40, or other sized detachable blade.

Blade cap 200 includes pockets, openings 204, and channels 206 to allow for liberal circulation of air through blade assembly 74 and/or 110. Pockets, openings 204, and channels 206 are located between blade cap 200 and outer/lower blade 78 and/or 120 of blade assembly 74 and/or 110 to increase air circulation through blade assembly 74 and/or 110. Channels 206 interconnect and/or couple open pockets on surface 202 located between inner surface 202 of blade cap 200 and blade assembly 74 or 110 and/or outer blade 78 or 120.

Figure 11:
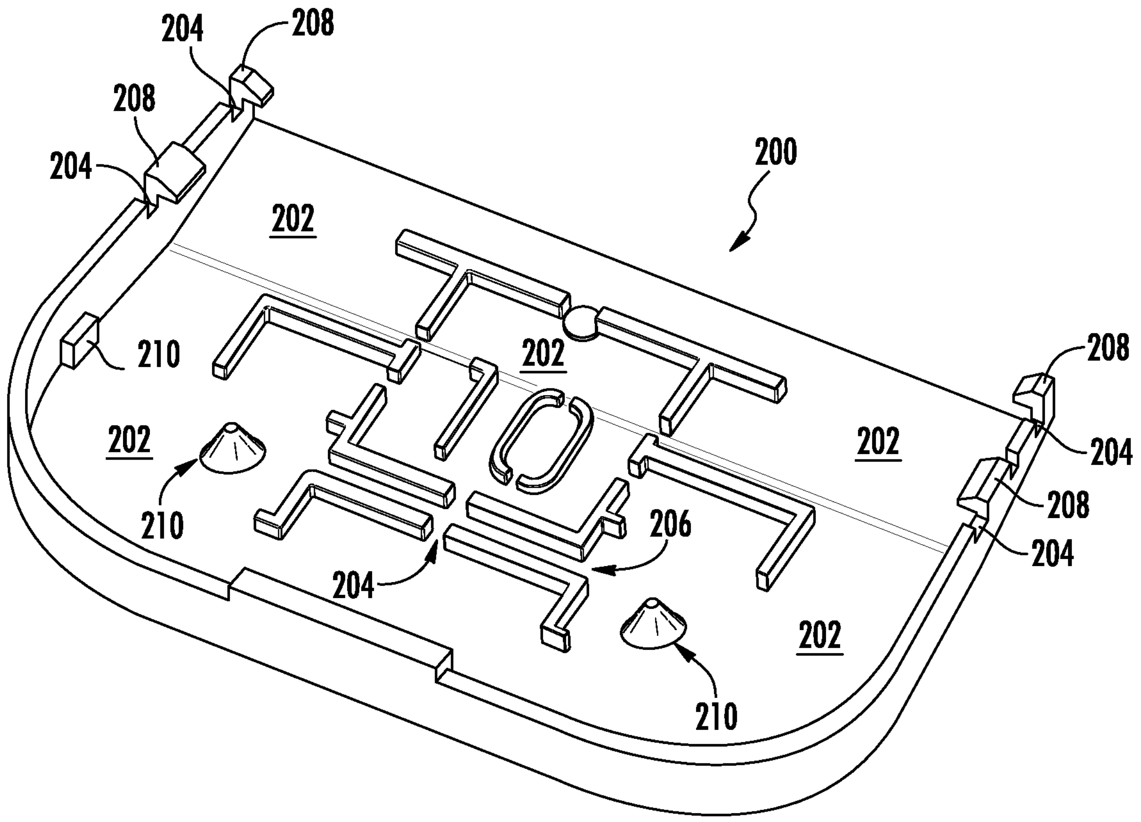
FIG. 11 is a perspective view of the blade cap of FIGS. 12 and 13 that illustrates various formations and features of the blade cap, according to an exemplary embodiment.

As illustrated in FIG. 11, blade cap 200 further includes one or more snap tabs or tab clips 208 to quickly connect blade cap 200 to the blade assembly. This configuration of air flow channels 206, openings 204, and tab clips 208 allows for air circulation that cools blade assembly 110. For example; tabs or clips 208 are located on a perimeter of blade cap 200 and/or partially surround blade 78 and/or 120. For example, blade cap 200 engages an inner surface of blade 78 and/or 120 and/or another feature of blade assembly 74 and/or 110. Clips 208 further securing blade cap 200 to outer or lower blades 78 or 110. The air circulation maintains the temperature of blade assembly 110 so that blade cap 200 remains cool to the touch while in operation. Projections 210 are illustrated on blade cap 200 to stabilize blade cap 200 against blade assembly 74 and/or 110, specifically fixed outer blade 78 and/or lower blade 120 (see e.g., FIG. 5). In various embodiments, projections 210 are cylindrical, cubical and/or rectangular, conical, and/or cone shaped. Projections 210 are located on inner surface 202 of blade cap 200 to stabilize blade cap 200 when pressed and/or jarred against the skin of a user. Projections 210 stabilize blade cap 200 against blades 78 and 120 and/or blade assembly 74 and 110. The thermal insulation provided by blade cap 200 protects the user from discomfort or burns when removing outer blade 78 (or 120), or blade assembly 70 (or 110), and when the blade 78 and/or 120 is in use and in direct contact with the skin.

Figure 12:
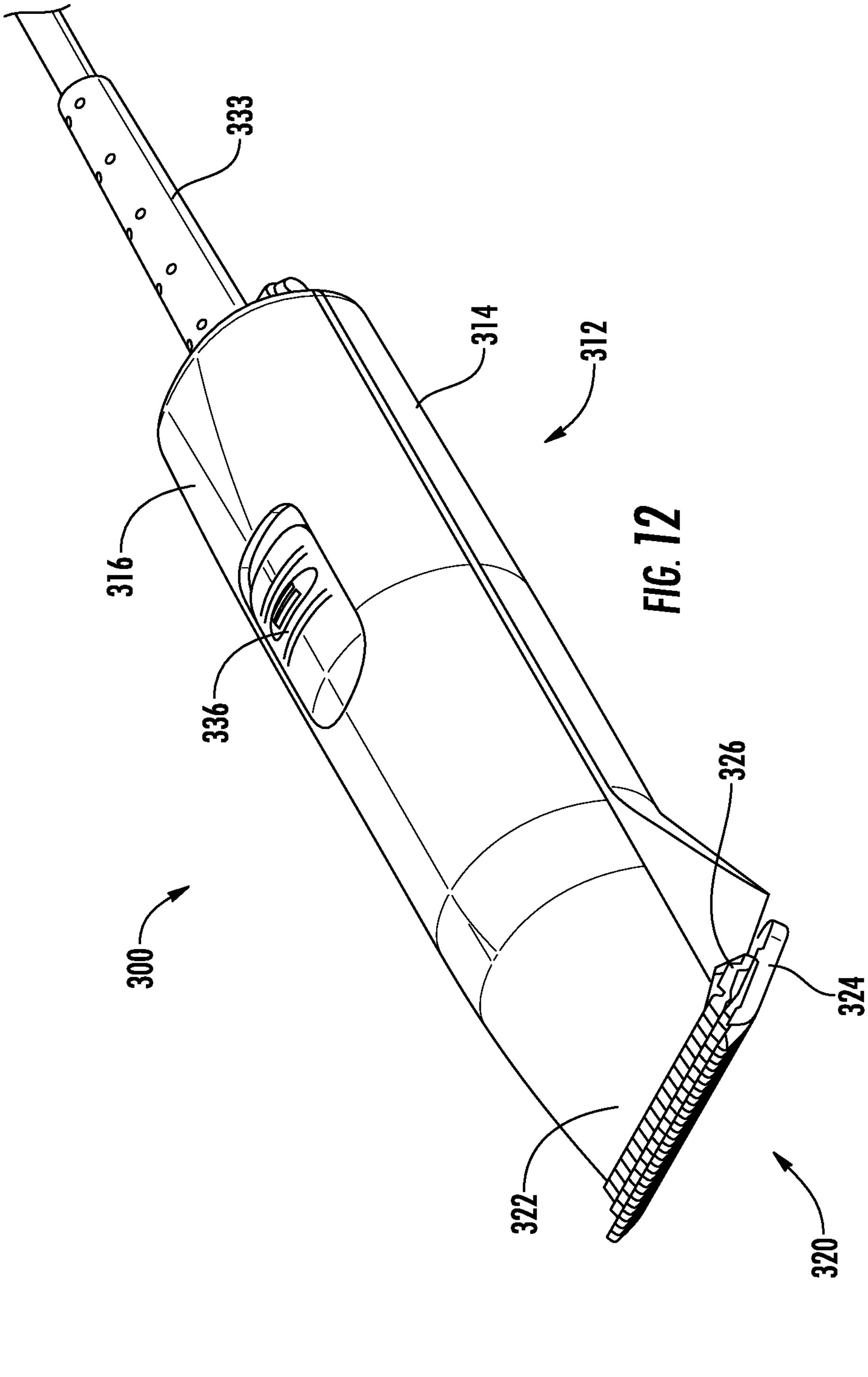
FIG. 12 is a perspective view of a corded hair clipper, according to an exemplary embodiment.

FIG. 12 shows another embodiment of a hair clipper 300 having a hand-held body 312. Hair clipper 300 is the substantially the same as hair clipper 10, except for the differences described. In contrast to hair clipper 10, hair clipper 300 has an electrical cord and optionally may include a drive cap 322. Body 312 includes a lower housing 314 and a removable cover or upper housing 316. Lower housing 314 is coupled to upper housing 316 using any suitable method, such as mechanical fasteners, screws, adhesives, and/or snap fittings. A cutting head or blade assembly 320 is coupled to a cutting end of body 312. Blade assembly 320 includes a stationary lower plate or outer blade 324 and, in operation, an oscillating cutter plate or inner blade 326. Inner blade 326 is supported above outer blade 324, and is movable with respect to, e.g., oscillates over, outer blade 324. In some embodiments, inner blade 326 includes a yoke configured to engage an eccentric rotational drive assembly 28 (e.g., shown in FIG. 2). In operation, drive assembly 28 is configured to generate the oscillating or reciprocating movement of inner blade 326 such that blade assembly 320 functions to cut of hair. Drive cap 322 is located near blade assembly 320 to protect debris from entering drive assembly 28. In some embodiments, drive cap 322 is selectively removable. For example, an operator optionally removes drive cap 322 to adjust the tensile force between inner blade 326 and outer blade 324, clear debris from blade assembly 320 and/or drive assembly 28 or otherwise access the cavity created between lower and upper housings 314 and 316.

A power cord or source 333 is configured to connect to a suitable source of power, such as an outlet, battery, or other source of power. In contrast to the embodiment of FIG. 2 above that contains an internal battery, power source 333 couples to an electrical power supply, e.g., an outlet, to energize drive assembly 28 and/or inner blade 326 of blade assembly. A switch 336 is positioned on a top of body 312, more specifically upper housing 312 to selectively power drive assembly 28 (shown in FIG. 2) "on" or "off." Switch 336 is user operable, for example it can be actuated by a thumb or finger of the user. Positioning switch 336 into the "on" position provides power from power source 333 to drive assembly 326, while positioning switch 336 into the "off" position terminates power to drive assembly 326.

Figure 13:
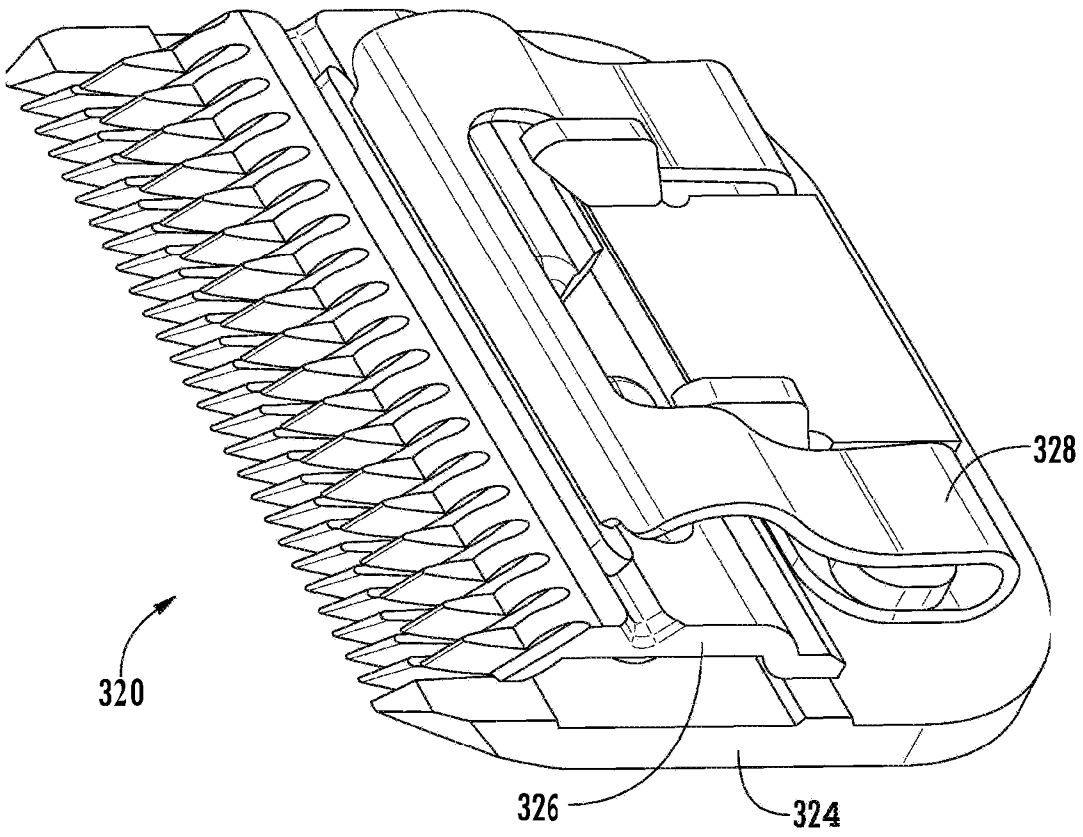
FIG. 13 is a perspective view of the blade assembly of the corded hair clipper of FIG. 12, according to an exemplary embodiment.

FIG. 13 is a detailed perspective view of blade assembly 320. This view shows inner blade 326 over outer blade 324. Blade assembly 320 is substantially the same as, or similar to, blade assemblies 70 and/or 110, except for the differences described. For example, blade assembly may include a yoke (not shown) the same as or similar to yokes 84 and/or 130 that receives an eccentric drive from a drive assembly 28 coupled to a motor 38 (FIG. 2). In contrast to blade assemblies 70 and/or 110, blade assembly 320 has a spring or bracket 328 that provides a tensile force between inner blade 326 and outer blade 324. This tensile force may be adjusted. For example, the tensile force between blades 324 and 326 is increased to reduce friction between inner and outer blades 326 and 324. Similarly, the tensile force is reduced to decrease the space between inner and outer blade teeth, such that the teeth cooperate to cut hair. In some embodiments, bracket 328 can translate inner blade 326 relative to outer blade 324 in a direction perpendicular to the oscillations of inner blade 326 to increase or decrease a gap between inner and outer blade teeth. The size of the gap increases or decreases the length of hair cut by blade assembly 320.

Figure 14:
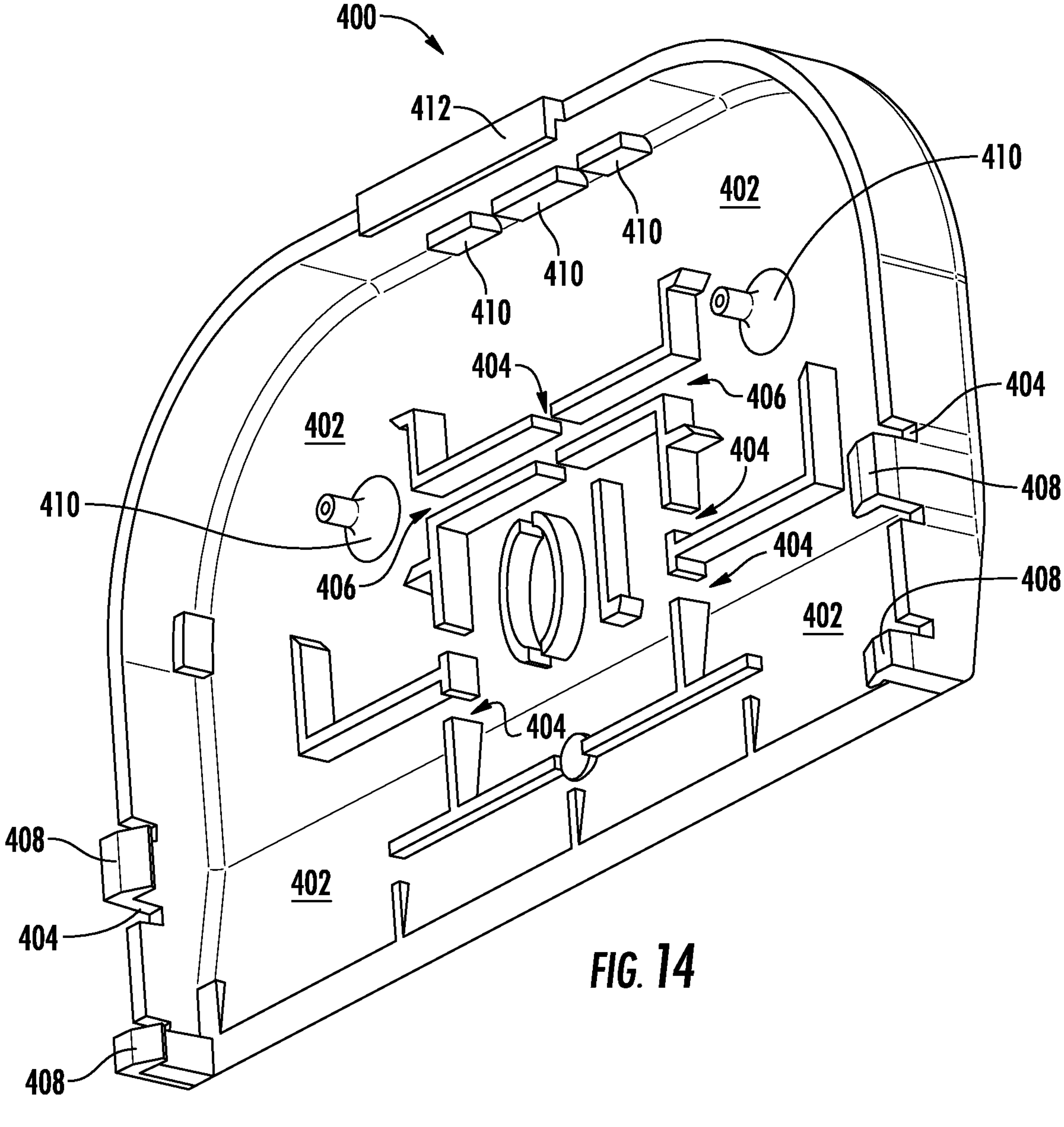
FIG. 14 is a perspective view of a blade cap configured for the blade assembly and clippers of FIGS. 12 and 13, according to an exemplary embodiment.

FIG. 14 shows a blade cap 400 configured for cutter 300 and/or blade assembly 320 of FIGS. 12 and 13. Blade cap 400 is substantially the same as blade cap 200, except that the dimensions and size is designed for the size of inner and outer blades 324 and 326 of blade assembly 320. Blade cap 400 is made of a material with a high thermal resistance (low thermal conductivity), relative to blade assembly 320.

Blade assembly 320 may be a metallic material and blade cap 400 includes a plastic and/or polymer material. For example, blade cap 400 includes a thermoset or thermoplastic polymer to protect the skin of a user during operation. In operation, blade cap 400 attaches (e.g., clips on) to outer blade 324 to protect the user from thermal transmission of heat generated by blade assembly 320. Blade cap 400 has features designed to circulate airflow and/or otherwise thermally insulate blade assembly 320 from the skin of a user.

Blade cap 400 couples to blade assembly 320 to protect the skin and/or, scalp of a user from the frictional heat generated during operation. Blade cap 400 includes voids on an inner surface of blade cap 400 that creates pockets 402 between blade cap 400 and an outer surface of outer blade 324. For example, voids are created between lower blade 120 and pockets 402 of blade cap 400. Openings 404 are illustrated on the side of blade cap 400 to vent air through the thermally isolating blade cap 400. For example, openings 402 are located on either side of blade cap 400 and are in fluid communication with ambient air. In some embodiments, openings 402 couple to pockets 402 of blade cap 400 and may or may not be in fluid communication with ambient air. For example, openings 404 communicates ambient air to pockets 402 of blade cap 400 to provide additional thermal insulation.

Figure 15:
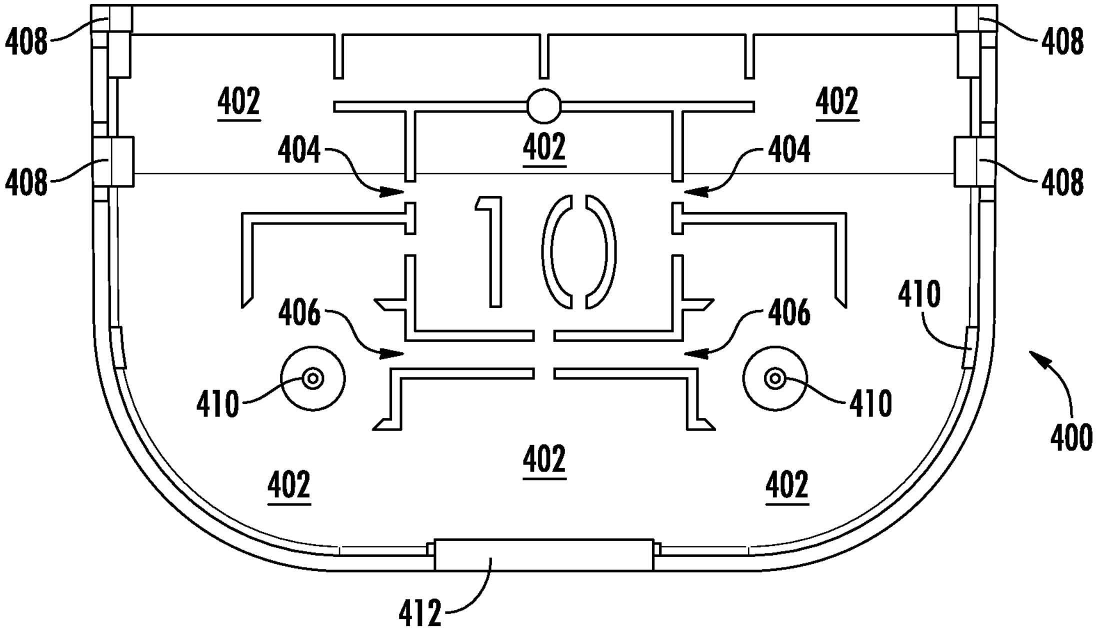
FIG. 15 is a top view of the blade cap of FIG. 14, according to an exemplary embodiment.

FIG. 15 is a detailed isometric top view of the inner surface of blade cap 400.

Pockets 402, openings 404, and/or air channels 406 are located on the inner surface of blade cap 400. In the illustrated embodiment of FIG. 15, blade cap 400 is configured for a number 10 detachable blade size; however, other blade sizes are envisioned. For example, blade cap 400 could be manufactured to fit a standard number 4, 5, 7, 10, 15, 30, and 40, or other sized detachable blade.

Blade cap 400 includes pockets 402, openings 404, and channels 406 to allow for liberal circulation of air through blade assembly 320. Pockets, openings 404, and channels 406 are located between blade cap 400 and outer/lower blade 326 of blade assembly 320 to increase air circulation through blade assembly 320. Channels 406 interconnect and/or couple open pockets on surface 402 located between pockets 402 of blade cap 400 and blade assembly 320 and/or outer blade 326.

Blade cap 400 further includes snap tabs 408 to quickly connect blade cap 400 to blade assembly. This configuration of air flow channels 406, openings 404, and snap tabs 408 allows for air circulation that cools blade assembly 320. For example; clips or tabs 408 are located on a perimeter of blade cap 400 and/or partially surround outer blade 324. For example, blade cap 400 engages an inner surface of blade 326 and/or another feature of blade assembly 320. Tabs 408 further secure blade cap 400 to outer blade 324. The air circulation maintains the temperature of blade assembly 320 so that it remains cool to the touch while in operation. Projections 410 are illustrated on blade cap 400 to stabilize blade cap 400 against blade assembly 320, specifically fixed or stationary outer blade 324. Projections 410 are cone shaped with a curvilinear cross-section, such that the cross section is broader at a bottom of projection 410, closest to the inner surface of blade cap 400, than it is at a top, nearest outer blade 324. Projections 410 are also located on or adjacent to pockets 402 of blade cap 400 to stabilize blade cap 400 when pressed and/or jarred against the skin of a user. Projections 410 stabilize blade cap 400 against blades 78 and 120 and/or blade assembly 74 and 110. The thermal insulation provided by blade cap 400 protects the user from discomfort or burns when removing outer blade 78 (or 120), or blade assembly 70 (or 110), and when the blade 78 and/or 120 is in use and in direct contact with the skin. An additional clip 412 partially covers or surrounds outer blade 324 and clips to a top or inner surface of outer blade. Clip 412 further secures blade cap 400 to blade assembly 320 and prevents accidental jarring or loosening of blade cap 400.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A hair cutter blade assembly comprising:
- an inner blade including inner blade teeth;
- an outer blade including outer blade teeth oriented parallel to the inner blade teeth, wherein the inner blade is supported relative to the outer blade such that the inner blade is moveable over the outer blade, wherein heat is generated on the outer blade as the inner blade moves;
- a thermal barrier removably coupled to the outer blade, the thermal barrier including a perimeter wall, the perimeter wall comprising:
  - a plurality of tabs extending inward, toward the outer blade, the plurality of tabs engaging the outer blade to secure the thermal barrier to the outer blade;
  - a plurality of openings defined within the perimeter wall such that air is vented through the thermal barrier; and
  - projections on an inner surface of the thermal barrier to stabilize the thermal barrier against the outer blade of the blade assembly.

2. The hair cutter blade assembly of claim 1, wherein the thermal barrier further includes a lateral side positioned along a lateral edge of the outer blade and wherein the plurality of tabs are positioned along the lateral side of the thermal barrier.

3. The hair cutter blade assembly of claim 1, wherein at least one of the plurality of openings of the perimeter wall are positioned between the plurality of tabs.

4. The hair cutter blade assembly of claim 1, further comprising a clip on the perimeter wall of the thermal barrier, the clip partially surrounding the outer blade and further securing the thermal barrier to the outer blade.

5. The hair cutter blade assembly of claim 1, further comprising voids on an inner surface of the thermal barrier between the thermal barrier and the outer blade, wherein the voids increase air circulation through the blade assembly.

6. The hair cutter blade assembly of claim 5, further comprising channels interconnecting the voids located between the thermal barrier and the outer blade.

7. The hair cutter blade assembly of claim 1, wherein the thermal barrier is formed from a polymer material.

8. A hair cutter, comprising:
a blade assembly, including:
an inner blade including inner blade teeth;
an outer blade including outer blade teeth oriented parallel to the inner blade teeth, wherein the inner blade is supported relative to the outer blade such that the inner blade is moveable over the outer blade, wherein heat is generated on the outer blade as the inner blade moves; and
a blade cap comprising:
a perimeter wall;
open pockets located between an inner surface of the blade cap and a surface of the outer blade; and
a plurality of projections located on the inner surface of the blade cap, wherein the plurality of projections are positioned against the perimeter wall of the blade cap to stabilize the blade cap against the outer blade, the blade cap being removably coupled to the outer blade.

9. The hair cutter of claim 8, the blade cap further comprising a plurality of openings defined within the perimeter wall such that air is vented through the blade cap.

10. The hair cutter of claim 9, further comprising a plurality of snap tabs and a clip on the perimeter wall of the blade cap, the snap tabs and the clip together engaging the outer blade and securing the blade cap to the outer blade.

11. The hair cutter of claim 10, wherein at least one of the plurality of openings of the perimeter wall is positioned between the plurality of snap tabs and the clip.

12. The hair cutter of claim 8, wherein the plurality of projections have a rectangular shape.

13. The hair cutter of claim 8, further comprising cone-shaped projections on the inner surface of the blade cap to further stabilize the blade cap against the outer blade.

14. The hair cutter of claim 8, further comprising channels interconnecting the open pockets located between the blade cap and the outer blade.

15. A hair cutter, comprising:
a blade assembly including:
an inner blade including inner blade teeth;
an outer blade including outer blade teeth oriented parallel to the inner blade teeth, wherein the inner blade is supported relative to the outer blade such that the inner blade is moveable, and wherein heat is generated on the outer blade as the inner blade moves; and
a thermal insulative barrier including:
open pockets located between an inner surface of the thermal insulative barrier and a surface of the outer blade, the open pockets receiving ambient air that circulates in the open pockets to thermally insulate the thermal insulative barrier;
a plurality of projections on the inner surface of the thermal insulative barrier and extending toward the outer blade, the plurality of projections providing structural support to the thermal insulative barrier when pressed against a surface of the outer blade; and
a plurality of channels located on the inner surface of the thermal insulative barrier and connecting the open pockets between the inner surface of the thermal insulative barrier and the outer blade.

16. The hair cutter of claim 15, wherein the thermal insulative barrier further includes a perimeter wall, the perimeter wall further including a plurality of tabs partially surrounding the outer blade and engaging on an inner surface of the outer blade, the tabs securing the thermal insulative barrier to the outer blade.

17. The hair cutter of claim 16, the perimeter wall of the thermal insulative barrier further comprising a pair of lateral sides positioned along lateral edges of the outer blade, each lateral side of the perimeter wall including openings extending through the perimeter wall of the thermal insulative barrier such that the openings are in fluid communication with ambient air.

18. The hair cutter of claim 17, wherein the openings extending through the perimeter wall of the thermal insulative barrier are positioned adjacent to the plurality of tabs.

19. The hair cutter of claim 17, the perimeter wall of the thermal insulative barrier further including a rear portion connecting the pair of lateral sides, the rear portion including a clip partially surrounding the outer blade and engaging on the inner surface of the outer blade, the clip further securing the thermal insulative barrier to the outer blade.

* * * * *